C. C. SHELBURN.

PUMP.

No. 11,392. Reissued Nov. 28, 1893.

Witnesses:

M. Fowler.

James R. Mansfield.

Inventor:

Cephas C. Shelburn by Alexander & Fowell

Atty's.

UNITED STATES PATENT OFFICE.

CEPHAS C. SHELBURN, OF COLORADO, TEXAS.

PUMP.

SPECIFICATION forming part of Reissued Letters Patent No. 11,392, dated November 28, 1893.

Original No. 442,209, dated December 9, 1890. Application for reissue filed August 19, 1891. Serial No. 403,135.

*To all whom it may concern:*

Be it known that I, CEPHAS C. SHELBURN, of Colorado, Mitchell county, Texas, have invented certain new and useful Improvements in Pumps; and I do hereby declare the following to be a full, clear, and exact description of the invention, such as will enable others skilled in the art to which it appertains to make and use the same.

My invention relates to pumps, more especially such as are used in connection with deep wells, and it consists in certain improvements in the construction of the same as hereinafter set forth and described.

Figure 1:
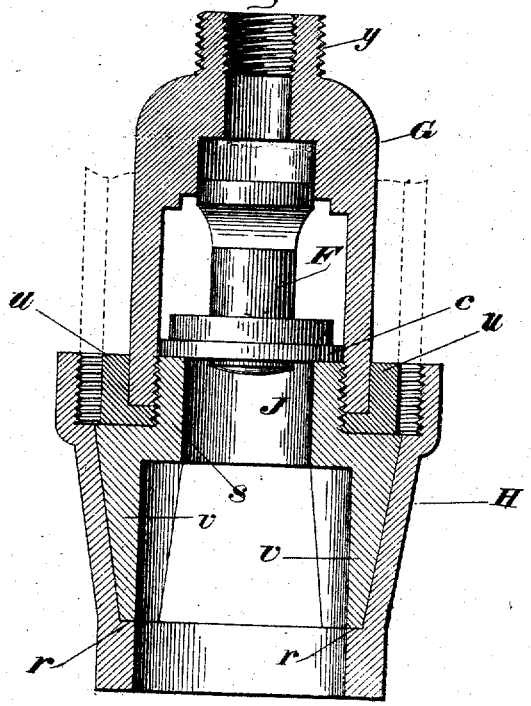
Figure 2:
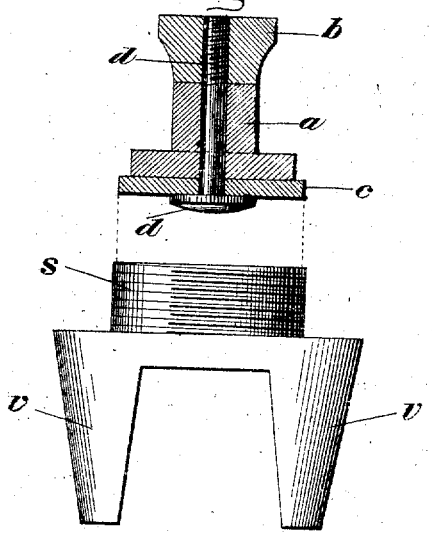

Figure 1 is a vertical section through the check valve and connections indicating the working barrel by dotted lines. Fig. 2 shows the check valve in section, and its seat detached.

At the lower end of working barrel is placed a check valve F in a valve cage G, a seat being constructed for said valve in the following manner: Casing or shell H is secured to the lower end of the working barrel, the said shell tapering downward and being provided with an annular shoulder *r* which is formed on its inner surface near its lower edge. The seat J, which fits in the shell H has a central opening surrounded by a flange *s*, so that an annular space is left between said flange and the shell to receive the valve cage G and the cup leather *u*, fitting on the lower edge of said valve cage. The seat J is also provided with bifurcations or downward extensions *v* which set against the shell and rest on shoulder *r*. The extensions *v* are made thin enough to be somewhat elastic and yield to pressure when the seat J is placed in the shell, but the seat is connected with the check valve and may readily be withdrawn with the latter when desired.

The valve F may be formed of a hollow stem *a'*, a leather facing *c*, and a head *b*, the parts being secured by a bolt *d*, which extends up through the stem and head *b*, is secured on the upper end of said bolt, as indicated in Fig. 2. The cage G is connected with flange *s* of seat J, and is provided with packing *u* at the bottom. The top *y* of cage G is provided with external and internal threads for the attachment of a rod by means of which the valve F with its cage and seat may be withdrawn from the working barrel when desired.

I claim—

1. The combination, with the working barrel, of a casing or shell secured to the lower end of said barrel, the said shell tapering downward and being provided with an annular shoulder *r* on its inner surface, a valve seat provided with an annular flange *s* and downward elastic extensions constructed to close against said shell and rest on said shoulder *r*, and a valve cage connected with said seat and containing a valve, substantially as and for the purpose described.

2. The combination with the working barrel of a pump, of a shell H attached to the lower part of said barrel and provided with an inner shoulder *r*, the seat J provided with flange *s* and elastic downward projections *v*, which set against the shell and rest on shoulder *r*, check valve F and cage G, the latter being connected with flange *s* and provided with packing at its lower edge, substantially as herein set forth.

In testimony whereof I have fixed my signature in the presence of two witnesses.

CEPHAS C. SHELBURN.

Witnesses:

R. A. JEFFRESS,

J. T. HAMESS.